United States Patent [19]

Wikholm

[11] Patent Number: 4,500,322
[45] Date of Patent: Feb. 19, 1985

[54] APPARATUS FOR REGULATION OF GAS FEED FOR GAS CONSUMPTION

[75] Inventor: Bert S. Wikholm, Tulline, Sweden
[73] Assignee: Alfa-Laval AB, Tumba, Sweden
[21] Appl. No.: 432,903
[22] PCT Filed: Feb. 11, 1982
[86] PCT No.: PCT/SE82/00041
§ 371 Date: Sep. 28, 1982
§ 102(e) Date: Sep. 28, 1982
[87] PCT Pub. No.: WO82/02782
PCT Pub. Date: Aug. 19, 1982

[30] Foreign Application Priority Data
Feb. 11, 1981 [SE] Sweden .................................. 8100938

[51] Int. Cl.³ ........................ F17D 3/00; G05D 16/00; G01L 7/22
[52] U.S. Cl. .......................................... 48/191; 48/190; 73/199; 73/221
[58] Field of Search .................... 48/190, 191; 73/223, 73/224, 221, 199, 747

[56] References Cited

U.S. PATENT DOCUMENTS
1,263,919  4/1918  Miller .................................... 73/199

FOREIGN PATENT DOCUMENTS
10739· of 1905  United Kingdom .

Primary Examiner—S. Leon Bashore
Assistant Examiner—K. M. Hastings
Attorney, Agent, or Firm—Cyrus S. Hapgood

[57] ABSTRACT

An apparatus for regulation feed for gas consumption from a source with a variable gas production. The apparatus is characterized by two chambers (1, 2). These communicate in their lower parts with each other. At least the first chamber (1) is closed in its upper end. The lower part of the chambers (1, 2) is provided with a gas inlet (3) from said source for gas production and a gas outlet (5) to said consumer. In the second chamber (2) there is provided a means (15) regulated by the liquid level for starting and shutting off the gas consumer.

4 Claims, 2 Drawing Figures

U.S. Patent  Feb. 19, 1985  4,500,322
Fig. 1
Fig. 2
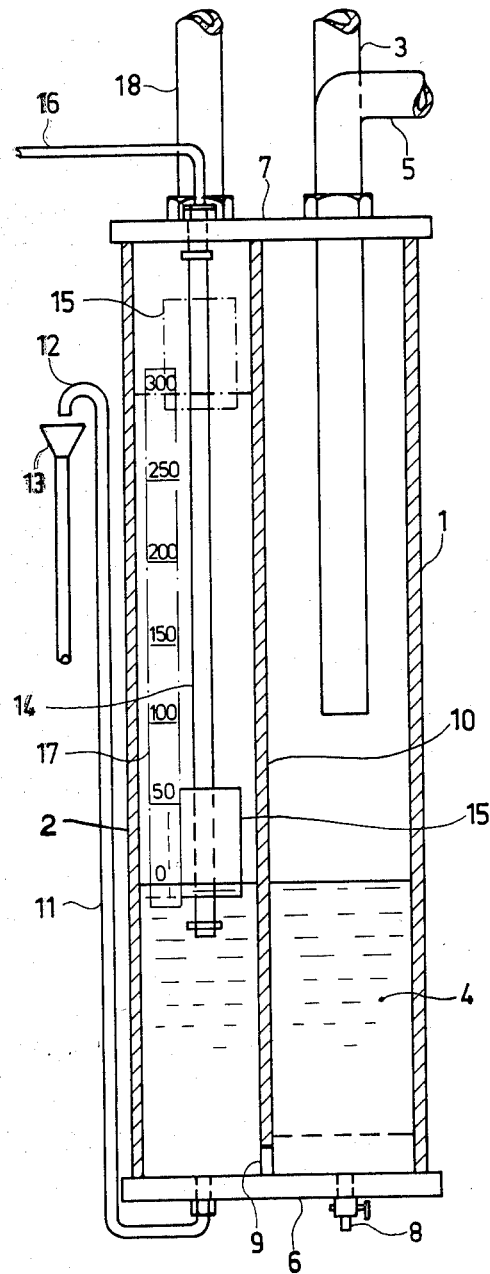
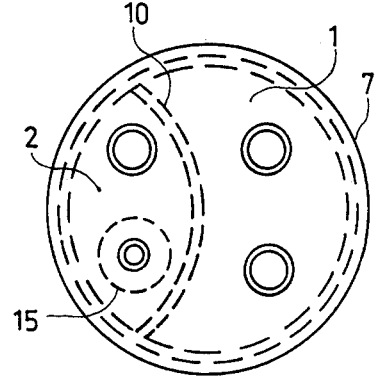

APPARATUS FOR REGULATION OF GAS FEED FOR GAS CONSUMPTION

This invention relates to an apparatus for regulation of gas feed for gas consumption from a source with a variable production.

It is known in the art to provide a gas regulator having a gas supply which is constantly under high pressure, the regulator serving a consumer requiring a constant gas supply under relatively low pressure. Such a regulator is disclosed in Miller U.S. Pat. No. 1,263,919 granted Apr. 23, 1918.

The object of the invention is to make optimal utilization of gas for consumption in such cases, where the supply of gas varies, for instance in anaerobic fermentation of manure in farms, methane gas being formed. This gas can for instance be combusted in a combustion engine for production of electrical current either directly or via an accumulator tank, which then serves as a gas buffer. According to the invention there is also provided an overpressure protection for the gas buffer and a preset regulation of the gas pressure to the consumer. These objects are met, according to the invention, by the aid of an apparatus, characterized by two chambers communicating in the lower ends, at least one of the chambers being closed in the upper end, the lower part of the chambers being filled with a liquid when in operation, the first chamber being provided with a gas inlet from said gas production source and with a gas outlet to said gas production source and with a gas outlet to said gas consumer, means regulated by the liquid level being provided in the second chamber, for starting and shutting of the gas consumer, which can be a motor, a gas combustion boiler or a gas pipe.

When the produced gas contains condensable or precipitable liquid, as is the case when producing methane by fermentation of manure, the liquid volume will increase in said chambers, by water being separated from the gas. This excess of water must be discharged, which can be done by providing the apparatus with a weit outlet, located outside the chambers, communicating with their lower part, the weir outlet being located on the same level as the starting level of said means.

If the gas production would occasionally be larger than the consumption, a gas overpressure discharge outlet may be arranged, extending from the upper part of the second chamber above the level of starting of the said means. Such a gas overpressure discharge outlet, which preferably leads out into the free air or to a torch, has an object, when for instance methane is produced; to prevent too high gas pressures from being built up on the system and dangerous gas concentrations from being formed indoors.

In some gas production, as the production of methane gas by fermentation of manure, the gas is not only followed by water vapour but also by solid particles. These two products are separated from the gas by providing said gas inlet opening a substantial way down in said first chamber, whilst the gas outlet to the consumer extends from the upper part of this chamber above the opening of the outlet. In this way water vapour is condensed from the gas phase and is combined with the water in the chamber. The solid particles are also separated and are captured by the water, whilst the gas is discharged through said gas outlet.

The invention shall be described more in detail in the following, reference being made to the enclosed drawing, which shows, by way of example, an embodiment of the present apparatus. To be more exact, FIG. 1 shows a longitudinal sectional view through the chambers, that are included in the apparatus and FIG. 2 a cross sectional view, as seen from above.

In FIG. 1, 1 denotes a first vertical pipe and 2 a second vertical pipe, constituting the chambers, which are included in the apparatus. Gas, containing water vapour and solid particles, enters through a line 3, which opens a substantial way down in the pipe 1. Water condensate drips from the opening of the line 3 down in an amount of water 4, which is present in the pipe, and which also captures separated, solid particles. Gas freed from water vapour and solid particles, is discharged through a line 5 to the consumer from the top of the pipe 1. The consumer can be a gas combustion boiler or a combustion engine, driving an electric generator. In the line 5 there can be provided a buffer tank for equalizing varying gas production. The two pipes 1 and 2 are closed at the ends by plates 6 and 7, and in the lower of these there is provided a discharge valve 8, through which water containing too much sludge can be removed. The pipes 1 and 2 communicate with each other through a hole 9. As is obvious from FIG. 2, one of the pipes, in this case the pipe 2, can have a substantially less cross sectional area than the other one. If the pipe 2 has a cross sectional area, which is half of that of the pipe 1, this means that a lowering of the water level in the pipe 1 corresponds to a double rise of the water level in the pipe 2, which circumstance increases the precision of the function of the apparatus. As is obvious from FIG. 2, the cross sectional form of the chambers of pipes can be optional, and in the embodiment shown, a compact design has been achieved by providing a common, convex wall 10. From the bottom of the pipe 2 there extends—via the bottom plate 6—a line 11, which leads to a weir outlet 12. Through this weir outlet the water is discharged, that is condensed out from the gas in the pipe 1. Via a hopper 13 the water flows on to an outlet. In the pipe 2 there is provided another pipe 14, containing an upper and a lower contact means, corresponding to a position for starting and shutting for a means 15, regulated by the liquid level consisting of a floating body. When there prevails atmospheric pressure in the pipes 1 and 2 (P=O), the liquid level is the same in both the pipes. The floating body 15 then resides in its lower position (starting position). Furthermore the floating body is arranged, in a way known per se, to act upon the contact means, when in operation its reaches said starting or shutting positions. Electrical wires 16, connected to said contact means forward the impulses from the contact means for starting and shutting of the consumer. A scale 17 makes it possible to get an idea about the position of the floating body 15, if at least the pipe 2 is made from a transparent material. From the top of the pipe 2 there extends a line 18 with an object to discharge any excess of produced gas to the free atmosphere or to a torch. Otherwise the apparatus is equipped with conventional instruments.

The apparatus operates in the following way:

Before the start of the apparatus the liquid level in the two pipes 1 and 2 is at P=O on the scale 17. When the gas flows into the pipe 1, the water level is pressed downwards in this pipe and rises at the same time in the pipe 2. The actual gas pressure can be read from the position of the floating body 15 in relationship to the scale. When the floating body has risen to the upper position, indicated by dotted lines (P=300) the contact means located there acts, and the consumer starts and continues its consumption until the floating body has sunken, for instance to position P=50, provided that the gas consumption is greater than the gas production. In this latter position the floating body acts upon a contact means situated in the place, which shuts the consumer or shuts the gas connection to the consumer, whereupon the gas pressure is allowed to rise to P=300. If there is an occasional excess production of gas, the liquid level in the pipe 1 will sink down to the position of the hole 9. If the excess production of gas continues, gas will flow through the hole 9 and up through the liquid column in the pipe 2 and reaches the space above this, finally to be discharged through the line 18.

We claim:

1. An apparatus for regulation of gas feed for gas consumption from a source with a variable gas production, which comprises means forming first and second chambers communicating with each other at their lower ends, at least one of the chambers being closed at its upper end, a liquid filling the lower parts of said chambers, the first chamber having an inlet for supplying gas from said source, said first chamber also having a gas outlet separate and distinct from the gas inlet for delivering gas to a gas consumer, and control means located in said second chamber and including contact means in a high position operable to start the gas consumer in response to a high liquid level in said second chamber and contact means in a low position operable to shut off the gas consumer in response to a low liquid level in the second chamber.

2. An apparatus according to claim 1, in which said gas inlet opens a substantial way down in said first chamber, said gas outlet to the consumer extending from the upper part of the first chamber above the opening of said inlet.

3. An apparatus for regulation of gas feed for gas consumption from a source with a variable gas production, which comprises means forming first and second chambers communicating with each other at their lower ends, at least one of the chambers being closed at its upper end, a liquid filling the lower parts of said chambers, the first chamber having an inlet for supplying gas from said source, said first chamber also having a gas outlet separate and distinct from the gas inlet for delivering gas to a gas consumer, control means located in said second chamber operable to start the gas consumer in response to a high liquid level in said second chamber and to shut off the gas consumer in response to a low liquid level in the second chamber, and means forming a weir outlet located outside said chambers and communicating with their lower parts, said weir outlet being on the same level as said high liquid level.

4. An apparatus according to claim 3, comprising also means forming a gas overpressure discharge outlet extending from the upper part of the second chamber at a level above said high liquid level.

* * * * *

UNITED STATES PATENT AND TRADEMARK OFFICE
CERTIFICATE OF CORRECTION

PATENT NO. : 4,500,322
DATED : February 19, 1985
INVENTOR(S) : Bert S. Wikholm et al.

It is certified that error appears in the above—identified patent and that said Letters Patent is hereby corrected as shown below:

On the Title Page, Item [75] should read

--[75] Inventors:    Bert S. Wikholm, Tulline, Sweden

Torsten L. T. Carlsson, Sodertalje, Sweden

Ake R. Oster, Tumba, Sweden   --.

Signed and Sealed this

Twenty-second Day of July 1986

[SEAL]

Attest:

DONALD J. QUIGG

Attesting Officer        Commissioner of Patents and Trademarks